United States Patent [19]

Hoseney et al.

[11] 4,044,155
[45] Aug. 23, 1977

[54] NONFAT DRY MILK SUBSTITUTE FOR YEAST-LEAVENED BAKED PRODUCTS

[75] Inventors: Russell C. Hoseney; Rujira Srisuthep Ling, both of Manhattan, Kans.

[73] Assignee: The Kansas State University Research Foundation, Manhattan, Kans.

[21] Appl. No.: 641,293

[22] Filed: Dec. 16, 1975

[51] Int. Cl.$^2$ .......................... A21D 2/02; A21D 2/36
[52] U.S. Cl. ........................................ 426/62; 426/21; 426/23; 426/583; 426/653
[58] Field of Search ................... 426/26, 653, 583, 21, 426/23, 62

[56] References Cited

U.S. PATENT DOCUMENTS

| 2,978,330 | 4/1961 | Ferrari ................................. 426/26 |
| 3,494,770 | 2/1970 | Swerak et al. ..................... 426/26 X |
| 3,531,294 | 9/1970 | Glabau ................................. 426/653 |

FOREIGN PATENT DOCUMENTS

| 137,365 | 1919 | United Kingdom ................... 426/26 |

*Primary Examiner*—Joseph M. Golian
*Attorney, Agent, or Firm*—Schmidt, Johnson, Hovey & Williams

[57] ABSTRACT

A low-cost substitute for nonfat dry milk (NFDM) solids is provided which serves as a functional equivalent of NFDM in yeast-leavened doughs used in bread making or the like in terms of increasing desirable organoleptic properties such as loaf volume and crumb quality. The substitute comprises a component such as an ammonium salt which serves as a source of ammonium ion in the dough, and in preferred forms includes a quantity of deproteinized whey, a protein supplement such as soy isolates, and where necessary a base for controlling the pH of the substitute. In the preferred form the substitute serves as both a functional and nutritional replacement for NFDM in yeast-leavened doughs but is much lower in cost and can be used without difficulty in both batch and continuous bread making processes. The substitute is advantageously incorporated into NFDM-free yeast-leavened doughs at levels for substantially increasing loaf volume and other organoleptic properties of baked goods derived from the doughs, and compared with baked goods derived from otherwise identical doughs free of the substitute. However, the substitute can also be used to good effect in doughs containing reduced levels of NFDM solids. In practice it has been found that the substitute should be added in amounts for providing from about 0.02 to 0.20% (baker's weight) of ammonium ion on a calculated basis in yeast-leavened doughs.

15 Claims, No Drawings

NONFAT DRY MILK SUBSTITUTE FOR YEAST-LEAVENED BAKED PRODUCTS

This invention relates to a nonfat dry milk substitute especially adapted to be incorporated into yeast-leavened doughs such as those used in bread making, and which is low in cost and usable both in conventional batch-type and continuous bread making operations. More particularly, it is concerned with an NFDM substitute and method of use thereof which provides a source of ammonium ion to the yeast-leavened dough at levels for substantially increasing the organoleptic properties of baked goods derived from such doughs, as compared with otherwise identical doughs free of NFDM or having reduced levels thereof; in preferred forms the substitute is supplemented with a protein source and deproteinized whey which serves as a source of vitamins and minerals, so that the NFDM substitute approximates NFDM solids both from a functional and nutritional standpoint.

The use of nonfat dry milk solids in yeast-leavened products is well-known in the baking industry. For example, commercial scale bread bakers have heretofore incorporated NFDM solids into bread dough for enhancing organoleptic properties such as loaf volume, crust color and crumb quality of their breads. In addition, use of NFDM solids has the additional advantage that it substantially boosts the nutritive value of the breads. In practice, NFDM solids have been used at levels up to about 6% (baker's weight) in a wide variety of yeast-leavened baked goods. However, certain problems have been encountered in using NFDM solids in continuous and short-time bread making processes, i.e., the milk supplemented doughs are slack or weak, require long proofing times, and the breads derived therefrom sometimes exhibit poor loaf volume and an open grain.

In any event, the rising cost of milk products of all kinds has led in recent years to a decrease in the use of NFDM solids by the baking industry, and in particular the use of such solids in breads. In fact, this cost factor has led many bakers to completely eliminate the use of NFDM solids even in batch-process breads, even though the resultant products are inferior in terms of organoleptic properties as compared with those produced with the milk solids. As can be appreciated, a definite commercial advantage could be obtained if a low cost substitute for NFDM could be used which would serve as at least a functional replacement for NFDM solids; furthermore, if such a substitute approached or exceeded milk solids from a nutritional standpoint as well, the additional advantages would be considerable. Finally, if the substitute could be used to good effect in the various types of bread making processes, a truly significant advance could be achieved.

As is well-known in the dairy processing industry, from about 6 to 9 pounds of whey is produced as a by-product from the production of one pound of cheese. Wheys are generally classed as either sweet, i.e., that produced when whole milk is used in cheese making, or acid, when skim milk is employed in cheese making. In dealing with the relatively large amounts of whey produced, it has been known to make whey protein concentrates which can be prepared from a number of processes including electrodialysis, ultrafiltration, and complexing with metaphosphate. The protein produced by such processes has been found to be useful in many food products. However, the remaining fraction of deproteinized whey, which contains the bulk of the lactose along with various salts and vitamins found in whole whey, has not been utilized in the food processing industry to any appreciable extent, and in fact represents a serious pollution problem to cheese producers.

A number of attempts have been made to incorporate whole, as opposed to deproteinized, whey into bread dough formulations as a substitute for nonfat dry milk solids normally used therein. See, for example, U.S. Pat. Nos. 3,061,442, 3,445,238 and 3,525,627. However, these attempts have achieved little commercial success since the resultant products do not exhibit organoleptic properties approaching those of NFDM supplemented products.

It is therefore the most important object of the present invention to provide a substitute for nonfat dry milk solids which is low in cost and especially adapted for incorporation into all types of yeast-leavened doughs in order to serve as a functional replacement for NFDM solids, and which finds special utility in both batch-type and continuous bread making processes without deleteriously affecting the organoleptic properties of the resultant baked products.

As a corollary to the foregoing, another object of the invention is to provide an NFDM substitute for yeast-leavened bread doughs and the like which includes as a component thereof a compound such as an ammonium salt which serves a resultant of ammonium ion in the dough; the substitute is preferably incorporated into doughs prior to baking thereof in amounts such that the quantity of ecological ion provided is sufficient to substantially enhance the organoleptic properties of the resultant baked goods as compared with those derived from an otherwise identical dough which is free of the NFDM substitute.

A still further object of the invention is to provide a NFDM substitute of the type described which includes respective quantities of deproteinized whey, an ammonium ion source, and preferably a protein supplement such as soy isolates, so that pg,5 the rsultant substitute serves as an effective functional and nutritional replacement for nonfat dry milk solids in bread doughs or the like while moreover alleviating the ecoligial problems heretofore encountered with the disposal of deproteinized whey.

The present invention is based principally upon the discovery that a sufficient amount of an ammonium ion source incorporated into a yeast-leavened dough formulation can serve as an effective functional substitute for nonfat dry milk solids.

In this connection, it has been known in the past to use an ammonium salt such as $NH_4Cl$ in yeast foods sometimes added in small amounts to bread doughs. See. e.g., U.S. Pat. No. 3,061,442. However, the use of ammonium salts in these types of applications is very minor and the salts are not present in amounts for significantly enhancing the organoleptic properties of the resultant breads.

In its broadest aspects, the invention involves providing a substitute having as a component thereof a substance which is capable of serving as a source of ammonium ions in yeast-leavened doughs. For example, the invention comprehends a method of making yeast-leavened baked goods such as breads wherein the dough is essentially free of nonfat dry milk solids. In the method a substance is incorporated into the dough prior to baking thereof which serves as a source of ammonium ion, and in preferred forms this substance is added in an amount for substantially enhancing at least certain of the organoleptic properties of the resultant baked goods as compared with goods derived from an otherwise identical dough which is essentially free of the substance. The NFDM substitute hereof can be used in batch, short-time, no-time and continuous bread making procedures without deleterious results, and the substitute supplemented doughs can be handled, proofed and baked in the well-known manner without any specialized techniques.

In more detail, it has been determined that the ammonium ion providing substance should be present in the dough at a level to provide from about 0.02 to 0.20% (baker's weight) of ammonium ion to the dough, and more preferably from about 0.027 to 0.10% (baker's weight) of ammonium ion. In terms of organoleptic properties, sufficient ammonium ion should preferably be present in the dough to increase the volume of the resultant baked goods (such as loaf volume in bread) at least about 5% over the volume of goods derived from an otherwise identical dough free of NFDM solids and the substitute hereof.

Although a wide variety of substances can be employed as ammonium ion sources in the substitutes of the invention, the substance is preferably selected from the group consisting of ammonia, ammonium hydroxide, ammonium carbonate, ammonium bicarbonate, ammonium dihydrogen phosphate, diammonium hydrogen phosphate, triammonium phosphate, ammonium chloride, ammonium sulfate, ammonium bisulfate, the ammonium salts of weak organic acids and mixtures thereof.

Although in most cases the bread or other baked yeast-leavened goods in accordance with the invention will be essentially free of nonfat dry milk solids (because of the cost thereof), the invention is not so limited. In particular, a dough formulation normally employing NFDM solids in order to impart particular organoleptic properties such as loaf volume and crust color to the baked goods may be modified by using a quantity of milk solids therein which is up to about 100% less than the amount of solids employed to give such baked goods the particular organoleptic properties strived for. In these situations the nonfat dry milk substitute hereof is incorporated into the dough formulation in lieu of the omitted NFDM solids preferably in an amount for contributing a quantity of ammonium ion to the formulation which is sufficient to maintain the particular organoleptic properties of the baked goods at a level at least substantially equal to those of baked goods derived from an otherwise identical dough formulation containing the amount of NFDM solids and being free of the milk substitute. In preferred forms, the quantity of NFDM solids is reduced by a factor of from about 50 to 100% relative to the amount normally employed in the dough formulation.

The preferred nonfat dry milk substituted in accordance with the invention includes in addition to an ammonium ion source, a quantity of deproteinized whey which adds lactose and various vitamins and minerals to the substitute. In addition, use of deproteinized whey in this fashion in large measure solves a disposal problem faced by cheese processers while at the same time providing a salable product. The makeup of an exemplary whole sweet whey is set forth below:

TABLE I

| Component | % By Weight |
|---|---|
| Protein | 12.9 |
| Fat | 1.1 |
| Ash | 8.0 |
| Lactose | 4.5 |
| Water | 73.5 |
| Total | 100.0 |
| Component | mg/100g of Whey |
| Thiamine | 0.50 |
| Riboflavin | 2.51 |
| Niacin | 0.80 |
| Biotin | 0.40 |
| Panothenic acid | 4.80 |
| Folic acid | 0.09 |
| Choline | 200.0 |
| Ca | 6.46 |
| Fe | 1.40 |
| Mg | 130.0 |
| P | 589.0 |
| K | — |
| Na | 700.0 |
| Vitamin A | 50 I. U. |

As can be seen, even when the protein fraction of whey is removed, substantial nutrients remain.

The elements of the preferred milk substitute containing deproteinized whey can be premixed and added to a dough formulation together, or incorporated individually into the dough. In preferred forms the deproteinized whey is added to the dough at a level up to about 2.5% (baker's weight), and more preferably within the range of from about 1.8 to 2.2% (baker's weight). In terms of a preferred premixed substitute, the latter should contain a sufficient quantity of an ammonium ion source to provide from about 1.0 to 10% by weight ammonium ion on a calculated basis in the substitute, and more preferably from about 1.35 to 5.0% by weight ammonium ion.

In other preferred embodiments a protein supplement may be added directly to the yeast-leavened dough or premixed with the other NFDM substitute components. If mixed directly, from about 1 to 5% (baker's weight) of protein supplement is advantageously used, and if premixed in the substitute a level of from about 20 to 60% by weight supplement therein should be maintained. In either case the supplement may be selected from the group consisting of soy flour and protein fractions therefrom, fish protein concentrate, cottonseed flour and protein fractions therefrom, chickpea flour, sesame seed flour, corn-soy-milk blend flour, wheat protein concentrate, wheat gluten, defatted wheat germ, Torula yeast, wheat-soy blend flour, edible single cell proteins, and mixtures thereof.

Finally, when an ammonium salt such as ammonium chloride is used as the ammonium ion source in the preferred substitute, it is sometimes beneficial to add a base to the substitute (or dough if the components of the substitute are added separately) in order to control pH and at least partially neutralize the deproteinized whey. This basic material is preferably selected from the group consisting of the oxides, hydroxides, carbonates and bicarbonates of sodium, potassium, calcium and magnesium, and should be added in an amount to give the substitute a pH within the range of from about 3 to 7, and more preferably of from about 5 to 6.

The following examples illustrate the present invention, but nothing therein should be taken as a limitation upon the scope of the latter.

EXAMPLE I

A series of baking tests were undertaken to determine the effect of adding an ammonium ion-providing compound, i.e., diammonium phosphate, to bread doughs. In addition, in certain cases quantities of commercially available soy isolates were added to the bread doughs in order to increase the protein levels thereof to a point approaching that obtainable through the use of NFDM solids.

The bread in each case was produced using a straight dough procedure with the following formula:

TABLE II

| | |
|---|---|
| Flour | 100 g (14% M. B.) |
| Sugar | 6 |
| Salt | 1.5 |
| Vegetable shortening | 3.0 |
| Malt syrup 60° L | 0.5 |
| Yeast | 2.0 |
| Potassium Bromate | Optimum |
| Water | Optimum |

The doughs were mixed to optimum, fermented at 30° C. and 90% relative humidity for 180 minutes, with mechanical punching after 105 and 155 minutes. The doughs were then machine molded and proofed for 55 minutes and baked at 218° C. for 25 minutes. Within 3 minutes after removing from the oven, the load volume was determined by the rapeseed displacement method. For any set of conditions sufficient loaves were baked to determine optimum water and potassium bromate in the formula. All test additives were directly mixed as dry granulations with the dough ingredients at the levels specified in Table III below.

The results in terms of loaf volume from this series of tests (Table III) clearly demonstrate the beneficial results obtained by adding the ammonium ion source to the doughs. Note that in all cases the diammonium phosphate increased loaf volumes a statistically significant amount. Furthermore, even in the protein supplemented bread the ammonium compound synergistically enhanced load volumes over the no-additive controls.

EXAMPLE II

Another series of baking tests were undertaken in order to test various other ammonium ion sources, both alone and taken in conjunction with a source of phosphate ion. The breads were produced in the manner described in Example I, with the additives listed in Table IV being incorporated into the doughs during preparation thereof.

The results of this series of tests are set forth in Table IV and further illustrate that use of an ammonium ion-providing source in yeast-leavened doughs synergistically increases loaf volume. Note that the amount of ammonium compound provided by each of the additives is set forth in the second column of Table IV, and that relatively minor amounts of the ion are effective.

In addition, the external and internal organoleptic characteristics such as loaf volume and crumb quality of bread baked with the ammonium salts were comparable to those of the loaf containing 4% NFDM, except the crust color was slightly pale and bromate requirement was somewhat less.

Gassing power tests demonstrated that after four hours of fermentation doughs containing 4% NFDM had a higher rate of gas production than those without milk. However, dough containing diammonium phosphate had a higher rate of gas production than any of the others. Of the other ammonium salts, ammonium chloride ($NH_4Cl$) and ammonium sulfate [$(NH_4)_2SO_4$] gave results similar to diammonium phosphate. However, ammonium hydroxide required a somewhat higher concentration in order to obtain the same rate of gas production as diammonium phosphate. Gas production was no better with diammonium phosphate plus milk than with diammonium phosphate alone. The lowering effect of ammonium hydroxide on gas production may stem from increasing the pH of the dough above optimum for yeast activity. In this respect there was no evidence of a detrimental effect from using an excess ammonium salts.

TABLE III

| Protein Source | [1]Amount | [1]Diammonium Phosphate | Water Absorption | Loaf Volume(cc) | % Increase in Loaf Volume |
|---|---|---|---|---|---|
| None | — | — | 61.5% | 812 | — |
| None | — | 0.2%[3] | 61.5% | 925 | 13.9% |
| NFDM | 4.0% | — | 63.5% | 923 | 13.7% |
| Edi-ProN[2] | 2.0% | — | 64.0% | 840 | |
| Edi-ProN | 2.0% | 0.2% | 65.0% | 895 | 6.55% |
| SuPro-610 | 2.0% | — | 65.0% | 835 | |
| SuPro-610 | 2.0% | 0.2% | 65.0% | 885 | 5.98% |
| Edi-ProN | 4.0% | — | 67.0% | 820 | |
| Edi-ProN | 4.0% | 0.2% | 68.0% | 877 | 6.95% |
| SuPro-610 | 4.0% | — | 69.0% | 800 | |
| SuPro-610 | 4.0% | 0.2% | 68.5% | 856 | 7.00% |

[1]Data given in terms of baker's weight.
[2]Edi-ProN and SuPro-610 are commercially available soy isolate protein supplements sold by the Ralston-Purina Company.
[3]Equivalent to 0.0544% calculated as ammonium ion.

TABLE IV

| Additive | Amount[1,2] | Loaf Volume(cc) | % Increase in Loaf Volume[3] |
|---|---|---|---|
| None-Control | — | 812 | — |
| NFDM (4g) | — | 923 | 13.7% |
| $(NH_4)_2HPO_4$ | 0.1043g | 932 | 14.8% |
| $NH_4OH$ | 0.0543g | 880 | 8.4% |
| $KH_2PO_4 + NH_4Cl$ | 0.1068g + 0.0845g | 895 | 10.2% |
| $H_3PO_4 + NH_4OH$ | 0.0769g + 0.0543g | 902 | 11.1% |

[1]Data given in terms of baker's weight.
[2]Weight of ammonium ion as calculated on the basis of the molecular weight of ammonium ion versus the total molecular weight of the additive compound is equal to 0.028% (baker's weight) in each case.
[3]Based upon no-additive control.

EXAMPLE III

This test was conducted to determine the effects on bread of adding a NFDM substitute consisting of deproteinized whey, an ammonium ion source, and a protein supplement. The baking tests were carried out in the manner described in Example I with ammonium hydroxide being used as the ion source. In each case the whey, NH₄OH and soy isolate were added separately and simply incorporated into the dough in the conventional manner. The results of these tests are set forth in Table V:

TABLE V

| Additive | [1]Amount | [1]Soy Isolate | [2]NH$_4$OH | Loaf Volume(cc) | [5]% Increase in Loaf Volume | Crumb Quality |
|---|---|---|---|---|---|---|
| None-Control | — | — | — | 900 | — | — |
| NFDM | 4.0% | — | — | 1000 | 11.1% | + |
| Deproteinized[3] Whey | 2.1% | — | — | 850 | −5.5% | − |
| " | 2.1% | — | 0.2% | 990 | 10.0% | + |
| " | 2.1% | [4]1.52% | — | 935 | 3.9% | + |
| " | 2.1% | 1.52% | 0.2% | 990 | 10.0 | + |

[1]Data given in terms of baker's weight.
[2]Calculated weight of ammonium ion is 0.10% (baker's weight) in each case.
[3]Deproteinized whey supplied by the Borden Company.
[4]Edi-ProN soy isolate sold by the Ralston-Purina Company.
[5]Based upon no-additive control.

The above data demonstrates that deproteinized whey neutralized with ammonium ion or a mixture of ions including ammonium ion will replace NFDM in yeast-leavened doughs. The breads produced in this test which had ammonium hydroxide and deproteinized whey incorporated into the doughs thereof had substantially equivalent loaf volumes, grain texture and crust color as the control bread having NFDM therein. Moreover, addition of a protein source in addition to the whey and ammonium hydroxide did not detract from the desirable organoleptic properties of the resultant breads.

In this connection, it will be understood that the breads containing only deproteinized whey and NH₄OH will not be nutritionally equivalent with breads containing NFDM; however, the nutritional characteristics of the latter are essentially matched by the breads containing the three-component milk substitute. Finally, although use of deproteinized whey alone depresses loaf volume, this additive is beneficial since it provides lactose and a number of salts and vitamins, and also tends to improve crust color.

Having thus described the invention, what is claimed as new and desired to be secured by Letters Patent is:

1. A yeast-leavened dough comprising respective quantities of flour, water, yeast, and a nonfat dry milk substitute, said substitute consisting essentially of:
   deproteinized whey;
   a quantity of a substance providing from about 1 to 10% by weight of ammonium ion in the substitute; and from about 20 to 60% by weight of a protein supplement;
said dough containing the substitute in an amount to provide about 0.02 to 0.2% (baker's weight) of ammonium ion in the dough.

2. The dough of claim 1 wherein said dough is essentially free of nonfat dry milk solids.

3. The dough of claim 1 wherein said substance is present in an amount to provide from about 0.027 to 0.10% (baker's weight) of ammonium ion.

4. The dough of claim 1 wherein said substance includes a compound selected from the group consisting of ammonia, ammonium hydroxide, ammonium carbonate, ammonium bicarbonate, ammonium dihydrogen phosphate, diammonium hydrogen phosphate, triammonium phosphate, ammonium chloride, ammonium sulfate, ammonium bisulfate, the ammonium salts of weak organic acids and mixtures thereof.

5. The dough of claim 1 wherein said deproteinized whey is present at a level of up to about 2.5% (baker's weight).

6. The dough of claim 5 wherein said level is from about 1.8 to 2.2% (baker's weight).

7. The dough of claim 1 wherein said protein supplement is selected from the group consisting of soy flour and protein fractions therefrom, fish protein concentrate, cottonseed flour and protein fractions therefrom, chick-pea flour, sesame seed flour, corn-soy-milk blend flour, wheat protein concentrate, wheat gluten, defatted wheat germ, Torula yeast, wheat-soy blend flour, edible single cell proteins, and mixtures thereof.

8. The dough of claim 1 wherein said supplement is present at a level of from about 1 to 5% (baker's weight).

9. A nonfat dry milk substitute for incorporation into yeast-leavened doughs, consisting essentially of:
   deproteinized whey;
   a quantity of a substance providing from about 1 to 10% by weight of ammonium ion in the substitute; and
   from about 20 to 60% by weight of a protein supplement.

10. The substitute of claim 9 wherein said substance is taken from the group consisting of ammonia, ammonium hydroxide, ammonium carbonate, ammonium bicarbonate, ammonium dihydrogen phosphate, diammonium hydrogen phosphate, triammonium phosphate, ammonium chloride, ammonium sulfate, ammonium bisulfate, the ammonium salts of weak organic acids and mixtures thereof.

11. The substitute of claim 9 wherein said substance is present in an amount for providing from about 1.35 to 5.0% by weight of ammonium ion in said substitute.

12. The substitute of claim 9 including sufficient basic material incorporated into the substitute to give the latter a pH of from about 3 to 7.

13. The substitute of claim 12 wherein said pH is from about 5 to 6.

14. The substitute of claim 12 wherein said basic material is selected from the group consisting of the oxides, hydroxides, carbonates and bicarbonates of sodium, potassium, calcium and magnesium.

15. The substitute of claim 9 wherein said supplement is selected from the group consisting of soy flour and protein fractions therefrom, fish protein concentrate, cottonseed flour and protein fractions therefrom, chick-pea flour, sesame seed flour, corn-soy-milk blend flour, wheat protein concentrate, wheat gluten, defatted wheat germ, Torula yeast, wheat-soy blend flour, edible single cell proteins and mixtures thereof.

* * * * *